United States Patent
Kato

(10) Patent No.: US 11,156,825 B2
(45) Date of Patent: Oct. 26, 2021

(54) PROJECTOR

(71) Applicant: NEC Display Solutions, Ltd., Tokyo (JP)

(72) Inventor: Atsushi Kato, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 481 days.

(21) Appl. No.: 16/316,323

(22) PCT Filed: Aug. 3, 2016

(86) PCT No.: PCT/JP2016/072804
§ 371 (c)(1),
(2) Date: Jan. 8, 2019

(87) PCT Pub. No.: WO2018/025351
PCT Pub. Date: Feb. 8, 2018

(65) Prior Publication Data
US 2021/0286164 A1    Sep. 16, 2021

(51) Int. Cl.
*G03B 21/20* (2006.01)
*G02B 26/00* (2006.01)
*G02F 1/1335* (2006.01)

(52) U.S. Cl.
CPC ......... *G02B 26/008* (2013.01); *G02F 1/1335* (2013.01); *G03B 21/204* (2013.01); *G03B 21/2066* (2013.01)

(58) Field of Classification Search
CPC .............. G03B 21/204; G03B 21/2033; G03B 21/2013; G03B 21/2066; G02B 26/008;
(Continued)

(56) References Cited

U.S. PATENT DOCUMENTS

| | | | |
|---|---|---|---|
| 2011/0075106 A1* | 3/2011 | Shibasaki | G03B 21/2013 353/31 |
| 2015/0109538 A1* | 4/2015 | Otani | G02B 27/141 349/8 |

FOREIGN PATENT DOCUMENTS

| CN | 1190700 C | 2/2005 |
|---|---|---|
| CN | 1645247 A | 7/2005 |

(Continued)

OTHER PUBLICATIONS

Chinese Office Action, dated Jul. 27, 2020, in Chinese Application No. 201680087941.0 and English Translation thereof.
(Continued)

*Primary Examiner* — Ryan D Howard
(74) *Attorney, Agent, or Firm* — McGinn IP Law Group, PLLC

(57) ABSTRACT

A projector includes: a phosphor wheel that, in response to the irradiation of excitation light that is used as the first illumination light, generates fluorescence that contains second illumination light and third illumination light and emits the excitation light and fluorescence in opposite directions; first to third image display elements that are provided corresponding to the first to third illumination light; a first illumination optical system that guides the excitation light that was emitted from the phosphor wheel to the first image display element; and a second illumination optical system and third illumination optical system that guide the second illumination light and third illumination light that are contained in the fluorescence emitted from the phosphor wheel to the second image display element and to the third image display element. The lengths of the optical paths of the first, second, and third illumination optical systems are the same.

7 Claims, 6 Drawing Sheets

(58) Field of Classification Search
CPC ... H04N 9/3158; H04N 9/3161; H04N 9/3164
See application file for complete search history.

(56) References Cited

FOREIGN PATENT DOCUMENTS

| | | |
|---|---|---|
| CN | 102419507 A | 4/2012 |
| JP | H11-014943 A | 1/1999 |
| JP | 2010-113186 A | 5/2010 |
| JP | 2012-004009 A | 1/2012 |
| JP | 2012-008303 A | 1/2012 |
| JP | 2012-123179 A | 6/2012 |
| JP | 2012-141411 A | 7/2012 |
| JP | 2012-234162 A | 11/2012 |
| JP | 2014-115555 A | 6/2014 |
| JP | 2014-170037 A | 9/2014 |
| JP | 2015-082091 A | 4/2015 |
| JP | 2015-125214 A | 7/2015 |

OTHER PUBLICATIONS

International Search Report (ISR) (PCT Form PCT/ISA/210), in PCT/JP2016/072804, dated Oct. 11, 2016.
Japanese Decision to Grant a Patent dated Jan. 7, 2020 for Japanese Patent Application No. 2018-531034.

* cited by examiner (a)

(b)

PROJECTOR

TECHNICAL FIELD

The present invention relates to a projector, and more particularly relates to a projector equipped with a phosphor wheel construction and an optical system construction that are well-suited for a three-panel-type projector.

BACKGROUND ART

Three-panel-type projectors have been put into practical use, an example being the projector disclosed in Patent Document 1 (Japanese Unexamined Patent Application Publication No. 2012-123179) that uses a blue (B) laser as excitation light, irradiates this excitation light upon a phosphor, and uses the thus-generated fluorescence for the illumination of red (R), green (G), and B display panels.

Similarly, DLP (Digital Light Processing) projectors have been put into practical use that use fluorescence or laser light without alteration in time divisions for the illumination of a single DMD (Digital Micromirror Device).

As the phosphor wheel construction that is used in this type of projector, the former three-panel-type projector uses a transparent disk shape having yellow (Y) phosphor formed on one side surface of this substrate, irradiates B laser light upon this phosphor, and mixes the yellow fluorescence (Y fluorescence) and B light that is the excitation light to obtain white light. This white light is divided into three colors in the optical system and used for illumination of the liquid crystal panels of each color. The white light is formed in the same direction as the propagation direction of the excitation light that is irradiated upon the phosphor wheel. Accordingly, this method of using the phosphor wheel can be seen as the transmissive type.

However, although three-panel-type projectors that use a white discharge lamp as the light source unit are known, adopting a construction in which the light source is replaced by a transmissive phosphor wheel and the excitation light of a B laser is supplied allows use of the optical system of this liquid crystal projector substantially in common.

In the latter single-panel DLP, the phosphor wheel is configured by forming a ring-shaped phosphor on a disk-shaped metal substrate such as aluminum, and excitation light is condensed and irradiated upon this phosphor material to then obtain fluorescence. Rather than using a fluorescent material that supplies a single emission color as the ring-shaped phosphor, the phosphor wheel is usually divided into a plurality of regions and phosphors that emit different fluorescence are used in each area. In addition, as an example, a region in which a phosphor is not formed is provided whereby R, G, B, and light of yet another color can be obtained in time divisions. In this phosphor wheel, fluorescence is usually extracted and used in the direction opposite the propagation direction of the irradiated excitation light. Accordingly, this method of using the phosphor wheel can be seen as the reflective type.

Although a single-panel DLP projector that uses a white discharge lamp as the light source unit is known, the optical system of a single-panel DLP can be used substantially in common by adopting a configuration in which the light source unit is replaced by a reflective-type phosphor wheel and excitation light that is a B laser is supplied.

Typically, in comparison with a single-panel-type projector, a three-panel-type projector is said to have higher performance because it has a higher light utilization factor. This characteristic is obtained because the illumination light is irradiated upon the display panel constantly rather than in time divisions. Projectors that use a solid-state light source such as a laser and a light source realized by fluorescence can also be considered as similar.

However, the three-panel type has a more complex optical system than the single-panel type. This is because the number of display panels used is greater, and to this extent, the increase in the number of optical paths and components cannot be circumvented. As a result, miniaturization is problematic. Still further, even when considering only the light source portion that is composed of a laser and phosphor, when compared to a discharge lamp, the increase in the number of constituent parts and the accompanying increase in cost are unavoidable.

RELATED ART DOCUMENTS

Patent Documents

Patent Document 1: JP 2012-123179 A

SUMMARY

Problem to be Solved by the Invention

As described above, because a three-panel-type projector has a greater number of display panels that are used, a three-panel-type projector is to this extent subject to an unavoidable increase in the number of optical paths and parts, considered unamenable to miniaturization. Further, even when considering only the light source portion that is made up from a laser and phosphor, the unavoidable increase in the number of constituent parts and the accompanying increase in cost compared to a discharge lamp renders the optical system complex. The present invention realizes a three-panel-type projector that uses a phosphor that has high image quality and an optical system configuration that is improved to be simpler.

Means for Solving the Problem

The projector according to an exemplary aspect the present invention has:

a phosphor wheel that, in response to the irradiation of excitation light that is used as first illumination light, emits fluorescence that contains second illumination light and third illumination light and that emits the excitation light and the fluorescence in mutually opposite directions;

first to third image display elements that are provided corresponding to the first to third illumination light;

a first illumination optical system that guides excitation light that is emitted from the phosphor wheel to the first image display element; and second illumination optical system and third illumination optical system that guide the second illumination light and third illumination light that are contained in the fluorescence emitted from the phosphor wheel to the second image display element and the third image display element;

wherein the lengths of the optical paths of the first to third illumination optical systems are equal.

Effect of the Invention

According to the present invention that is provided with the above-described configuration, a three-panel-type projector is realized that uses a phosphor, that has high image quality, and in which the configuration of the optical system is improved and simple.

EXEMPLARY EMBODIMENT

Exemplary embodiments of the present invention are next described with reference to the accompanying drawings.

First Exemplary Embodiment

Figure 1:
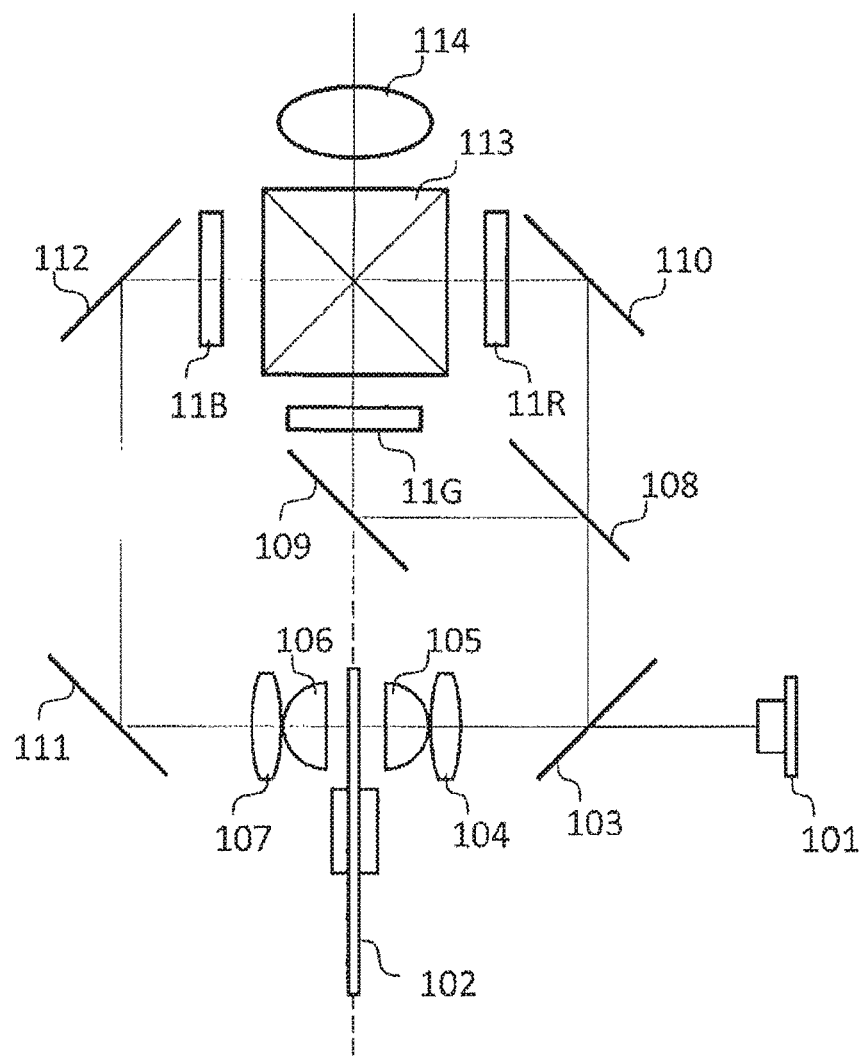
FIG. 1 is a block diagram showing the configuration of the optical system of the first exemplary embodiment of the projector according to the present invention.

FIG. 1 is a block diagram showing the configuration of the optical system of the first exemplary embodiment of the projector according to the present invention. The projector of the present exemplary embodiment is a three-panel liquid crystal projector that uses transmissive liquid crystal panels as the display panels.

The optical system shown in FIG. 1 is provided with: laser light source 101; dichroic mirrors 103 and 108; reflecting mirrors 110, 109, 111, and 112; phosphor wheel 102, lens systems 104 and 105 as well as 106 and 107; cross-dichroic prism 113, liquid crystal panels 11R, 11G, and 11B; and projection lens 114.

Laser light source 101 can use, for example, a semiconductor laser that emits a blue light beam having a wavelength of 440 nm-470 nm. The light beam emitted by this laser light source 101 is the excitation light of phosphor wheel 102. FIG. 1 depicts only one light source, but the number of light sources equipped is not limited to one.

Figure 6:
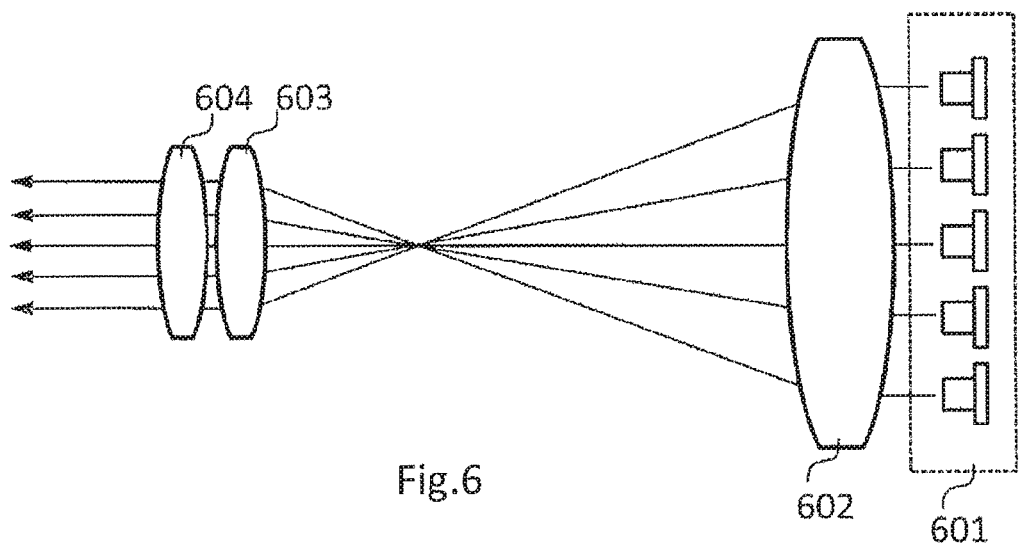
FIG. 6 shows an example of laser light source 101 that is used in the first exemplary embodiment.

As laser light source 101, a configuration can be adopted that uses, for example, a plurality of B lasers as shown in FIG. 6. In the example shown in FIG. 6, laser light source 601 that is provided with a plurality of B lasers and lens systems 602, 603, and 604 was used. In this example of the configuration, the diameter of the luminous flux of the overall excitation light is reduced by a process of first condensing the plurality of beams from laser light source 601 and then again making the beams parallel.

A component in which a thin film is formed by vapor deposition and that has the characteristic of transmitting the B light that is the excitation light emitted from laser light source 101 and reflecting light of other visible light bands is used for dichroic mirror 103.

A component in which a thin film is formed by vapor deposition and that has the characteristic of reflecting light of the G wavelength band and transmitting light of the R wavelength band is used for dichroic mirror 108.

Reflecting mirror 110 is a mirror having the characteristic of reflecting light of the R wavelength band. In addition to a mirror on which aluminum is vapor deposited, a dichroic mirror that reflects R light may also be used.

Reflecting mirror 109 is a mirror having the characteristic of reflecting light of the G wavelength band. In addition to a mirror on which aluminum is vapor deposited, a dichroic mirror that reflects G light may also be used.

Reflecting mirror 111 is a mirror having the characteristic of reflecting light of the B wavelength band. Apart from a mirror on which aluminum is vapor deposited, a dichroic mirror that reflects B light may also be used.

Reflecting mirror 112 is a mirror having the characteristic of reflecting light of the B wavelength band. Apart from a mirror on which aluminum is vapor deposited, a dichroic mirror that reflects B light may also be used.

Figure 2:
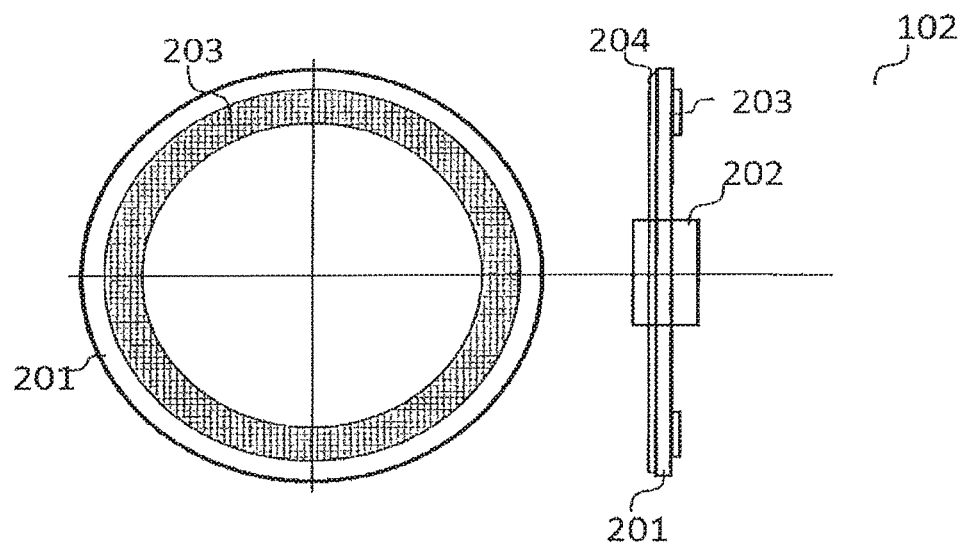
FIGS. 2(a) and (b) each show phosphor wheel 102 that is used in the first exemplary embodiment.
Figure 2:
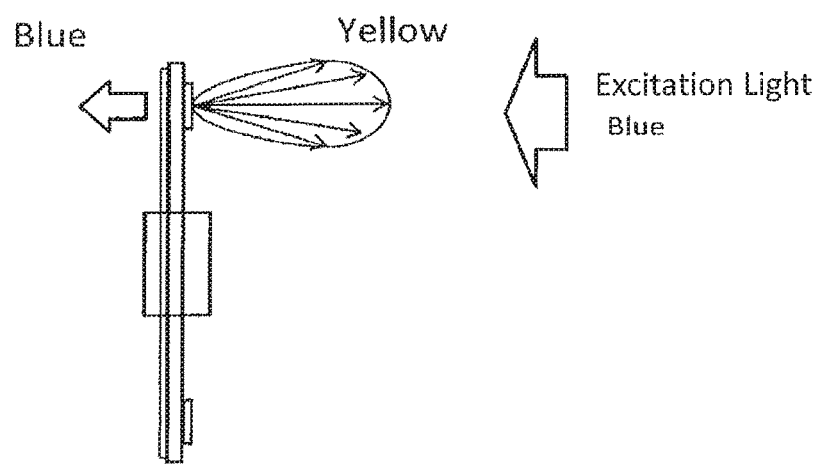

Phosphor wheel 102 is a component in which a phosphor is formed on a rotatable disk plate. FIG. 2(a) shows an example of the configuration of phosphor wheel 102 of the present exemplary embodiment.

Transparent substrate 201, motor 202, phosphor 203, and reflecting film 204 are provided. A material such as glass can be used as transparent substrate 201. It is known that phosphor 203 often reaches a high temperature in response to the irradiation of excitation light. In consideration of the ease of cooling, sapphire is preferably used as the material of transparent substrate 201.

Motor 202 is a component that drives the rotation of transparent substrate 201 and is normally affixed to the center of transparent substrate 201 that is assumed to be a circle.

Phosphor 203 is affixed by application or bonding in a ring shape on transparent substrate 201 and thus stably secured. If a YAG-series phosphor is used as the phosphor material, fluorescence is obtained in which the color of the excitation light is converted to Yellow.

Transparent substrate 201 transmits excitation light, and reflecting film 204 that has the characteristic of reflecting fluorescence and transmitting the excitation light is formed on the side of transparent substrate 201 on which phosphor 203 has not been formed. A reflecting film having these characteristics can be fabricated by using technology similar to that of a dichroic mirror.

The lens series are lens series 104 and 105 for condensing the excitation light upon a portion of phosphor of phosphor wheel 102 and lens series 106 and 107 for making parallel the excitation light that has been transmitted through phosphor wheel 102. In the present exemplary embodiment, an example of a two-layer configuration is introduced, but this does not mean that a two-layer configuration is optimum, and the configuration can be modified according to plan.

Dichroic prism 113 is a component used for combining the R, G, and B image light and is a well-known technology. Transmissive liquid crystal panel 11R, 11G, and 11B are similar to components used in well-known technology.

Projection lens 114 enlarges and projects a full-color image that has been formed by liquid crystal panels 11R (third image display element), 11G (second image display element), and 11B (first image display element) and combined by dichroic prism 113.

The operation of the present exemplary embodiment is next described. In FIG. 1, excitation light from laser light source 101 is transmitted through dichroic mirror 103 and condensed by lens series 104 and 105. When laser light source 101 is a semiconductor laser, the light beam is not necessarily a completely parallel light beam and has some degree of spread, and as a result, a lens or other component is preferably installed immediately after laser light source 101 to produce a parallel light beam.

Phosphor wheel 102 is arranged such that the surface of phosphor wheel 102 on which phosphor 203 is formed is in the vicinity of the condensation position of the excitation light. Yellow fluorescence is formed in response to the condensation and irradiation of the excitation light.

Fluorescence is produced by the irradiation of excitation light upon phosphor 203 of phosphor wheel 102, but excitation light in which the wavelength has not been converted is also present. This light is B, and the different light is separated.

The Y fluorescence generated by phosphor 203 is reflected on the laser light source-101 side, and the B light that is the excitation light is extracted in the direction opposite that of the Y fluorescence. This is because, as shown in FIG. 2(a), reflecting film 204 that has the characteristic of reflecting Y fluorescence and transmitting B is provided on the side of substrate 201 of phosphor wheel 101 on which phosphor 203 is not formed. Accordingly, the configuration is as shown schematically in FIG. 2(b). If the phosphor that is formed on phosphor wheel 101 is a YAG-series phosphor, the Y fluorescence has light of the R and G wavelength bands. In other words, if the drive of laser light source 101 is assumed to be continuously lighted, B light and the G and R light are simultaneously generated in opposite directions.

As described above, the fluorescence (Y light) generated by phosphor wheel 102 travels in the direction opposite that of the excitation light. The emission characteristic of the fluorescence obtained due to the wavelength conversion realized by the phosphor has radiation characteristics that are close to typical Lambertian light distribution.

Lens series 104 and 105 are designed such that this radiation characteristic is made substantially parallel luminous flux (collimated). This conversion is realized by well-known lens design technology.

The Y light that has become parallel luminous flux by means of the above-described optical system is reflected by dichroic mirror 103 and directed toward dichroic mirror 108. In dichroic mirror 108, the G light is reflected and the R light is transmitted. After the direction of travel of these two colors has been altered by reflecting mirrors 109 and 110, respectively, the G light and the R light irradiate G liquid crystal panel 11G and R liquid crystal panel 11R. Polarization plates (not shown) are provided before and after liquid crystal panels 11G and 11R. In addition, from the viewpoint of making the light utilization factor of the projector more efficient, an optical element for unifying the polarization direction is preferably provided. This is because light from laser light source 101 has a linear polarization characteristic, but fluorescence is nonpolarized light, and light that is effective as illumination light is limited to light having a linear polarization characteristic.

On the other hand, B laser light that was not converted to fluorescence by phosphor wheel 102 is turned back by reflecting mirrors 111 and 112 and used as the illumination light of liquid crystal panel IB.

A diffuser can be provided between phosphor wheel 102 and lens 105, between phosphor wheel 102 and lens 106, or in both positions. The effect of this diffuser is to both improve the uniformity of the condensed state of the excitation light that is condensed on phosphor 203 and give a predetermined angle of divergence to excitation light that is used as the B light without converting to fluorescence. The adoption of this type of configuration enables handling as a light source that is similar to Y fluorescence having radiation characteristics of substantially Lambertian light distribution.

B light that has been given a predetermined angle of divergence is made substantially parallel luminous flux by lens series 106 and 107. Lens series 106 and 107 can be obtained by a well-known lens design technology similar to lens series 105 and 106. Still further, it is not impossible to make lens series 105 and 106 and lens series 106 and 107 the same lens series. Making these the same lens series is advantageous from the viewpoint of commonality of parts and cost. In any case, this is a point of design and should be determined in consideration of product specifications.

The direction of travel of the B light that has become substantially parallel luminous flux is changed at reflecting mirrors 111 and 112 and the B light thus becomes the illumination light of B-liquid crystal panel 11B. Polarizing plates (not shown) are provided before and after liquid crystal panel 11B. In the projector configuration shown in FIG. 1, an integrator optical system can be provided to improve the uniformity of the illumination of the liquid crystal panels of each color. A fly-eye integrator is frequently used in three-panel-type liquid crystal projectors. Although an integrator optical system is not shown in FIG. 1, an integrator optical system can be provided in the first exemplary embodiment as well. Light that has been optically combined in liquid crystal panels 11R, 11G, and 11B is optically modulated in cross-dichroic mirror 113 and then enlarged and projected by projection lens 114.

However, in the optical paths of the optical system of the R-system (third illumination optical system) and the optical system of the G-system (second illumination optical system) that are realized by light obtained by separating Y fluorescence, the distance from phosphor wheel 102 that is the light source to each of liquid crystal panels 11R and 11G is equal. This is because the direction of advance of Y light is split by dichroic mirror 108 that is arranged at a 45-degree angle to the optical axis. In addition, in the optical system of the Y system and the optical system of the B system (first illumination optical system), the distances from phosphor wheel 102 to liquid crystal panels of each color 11R, 11G, and 11B are the same. This is because phosphor wheel 102 is provided on the extension of the optical axis of projection lens 114 (on the extension of the straight line that links the center of cross-dichroic prism 113 and the center of G liquid crystal panel 11G, shown by the broken line in FIG. 1), and as a result, the optical systems of the B system and R system are made a symmetrical arrangement with the substrate surface of phosphor wheel 102 as the border. As a result, the distances between phosphor wheel 102 and liquid crystal panels 11R, 11G, and 11B of all three R, G and B systems can be made equal. The relay optical system that was considered necessary in a conventional three-panel liquid crystal projector can be obviated. Of the optical systems of the three R, G, and B systems, making one system the relay optical system required great effort to ensure the projected image quality, and in particular, to ensure the brightness of the screen and the color uniformity. Nevertheless, in the present exemplary embodiment, the relay optical system is not necessary and all three systems are covered by the same optical system, and a uniform and bright projected image of high image quality can be obtained.

Second Exemplary Embodiment

Figure 3:
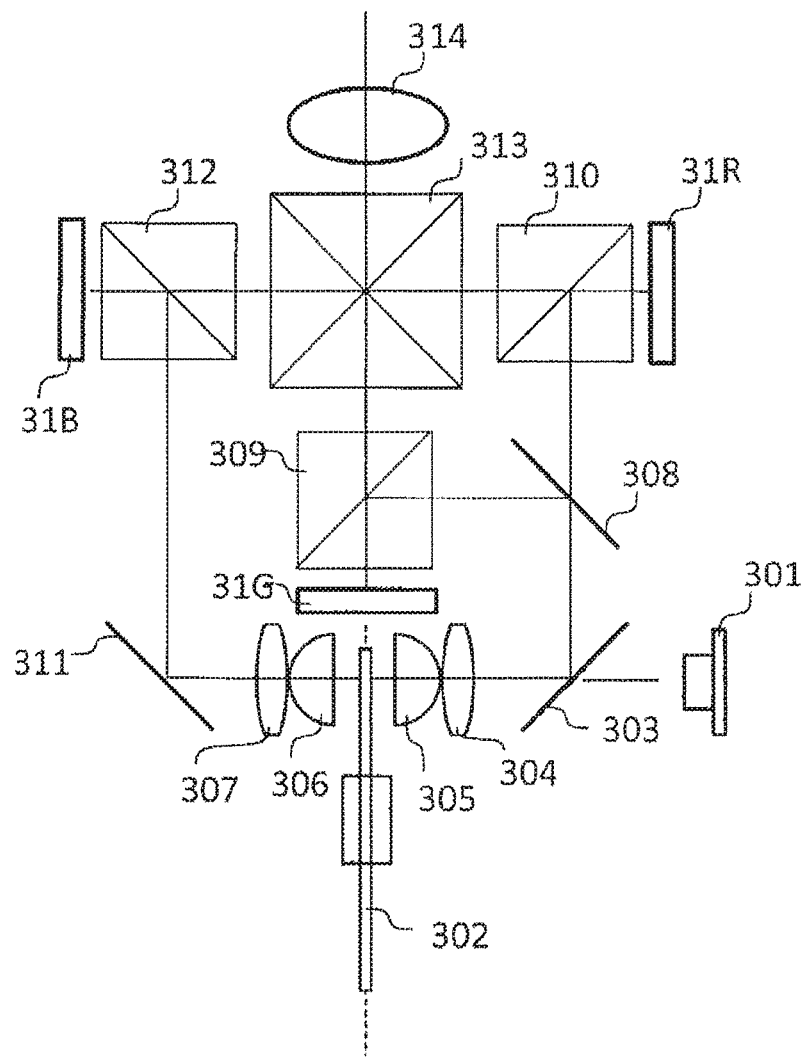
FIG. 3 is a block diagram showing the configuration of the optical system of the second exemplary embodiment of the projector according to the present invention.

The second exemplary embodiment of the present invention is next described. FIG. 3 is a block diagram showing the configuration of the optical system of the second exemplary embodiment of the projector according to the present invention. In the present exemplary embodiment, in contrast to the use of a transmissive liquid crystal panel as the display panel in the first exemplary embodiment, a reflective liquid crystal panel (LCOS: Liquid Crystal on Silicon) is used as the display panel, and together with this display panel, different optical system parts are used.

The optical system shown in FIG. 3 is provided with: B laser light source 301; dichroic mirrors 303 and 308; lens series 304 and 305; phosphor wheel 302; lens series 306 and 307; reflecting mirror 311; polarization beam splitters 309, 310, and 312; reflective liquid crystal panels 31R, 31G, and 31B; cross-dichroic prism 313; and projection lens 314.

Regarding operation, the present exemplary embodiment is similar to the first exemplary embodiment. The excitation light from laser light source 301 is condensed in the vicinity of the surface of the phosphor of phosphor wheel 302 to there obtain Y fluorescence. This Y fluorescence advances to the laser light source-301 side but is reflected by dichroic mirror 303 that is provided between laser light source 301 and phosphor wheel 302 and directed toward dichroic mirror 308. This is because dichroic mirror 303 has the characteristic of reflecting Y fluorescence and transmitting B light.

Y fluorescence that reaches dichroic mirror 308 is separated into G light and R light by dichroic mirror 308 having the characteristic of reflecting G light and transmitting R light. The G light that is reflected by dichroic mirror 308 is reflected by polarization beam splitter 309 and undergoes optical modulation by reflective liquid crystal panel 31G. The R light that is transmitted through dichroic mirror 308 is reflected by polarization beam splitter 310 and undergoes optical modulation by reflective liquid crystal panel 31R.

In the optical system of the present exemplary embodiment, an integrator optical system can be provided to improve the uniformity of illumination upon display panels 31R, 31G, and 31B. In addition, the light that is used in the modulation of display panels 31R, 31G, and 31B is linearly polarized light, and the fluorescence is non-polarized light. Accordingly, an optical element for unifying the polarized light is preferably provided in the optical system. Still further, a component such as a polarizing plate or a phase difference plate is preferably provided in display panels 31R, 31G, and 31B. The B light from the phosphor wheel both receives the effects of light diffusion realized by, for example, a diffuser (not shown) and parallelization realized by lens series 306 and 307 and directed toward B display panel 31B. Midway to display panel 31B, the light experiences an alteration of the optical path due to reflecting mirror 311. The light is further reflected by polarization beam splitter 312 and undergoes optical modulation by B display panel 31B. An integrator optical system or an optical element for polarization unification is preferably provided, similar to the R and G optical systems.

Polarization beam splitters 309, 310, and 312 are components that transmit P-polarized light and reflect S-polarized light, and as a result, each of polarization beam splitters 309, 310, and 312 is provided with a phase difference plate or a polarizing plate at the position of incidence to convert the incident light to S-polarized light, and a quarter-wave plate is provided between each of the polarization beam splitters 309, 310, and 312 and display panels 31R, 31G, and 31B of each color. Light that has undergone optical modulation by display panels 31R, 31G and 31B of each color is converted to P-polarized light by being twice transmitted through this quarter-wave plate, passes through each of polarization beam splitters 309, 310, and 312, combined by dichroic prism 313, and enlarged and projected by projection lens 314.

Focusing on phosphor wheel 302, phosphor wheel 302 is provided on the extension of the optical axis of projection lens 314 or on the extension of the straight line that passes through the center of cross dichroic prism 313 and the center of the display panel. Accordingly, the B and R optical systems are symmetrical with respect to phosphor wheel 302, and the distances from phosphor wheel 302 to B display panel 31B and R display panel 31R are equal. Still further, the distances to R display panel 31R and G display panel 31G from phosphor wheel 302 are also equal. Accordingly, the distances to phosphor wheel 302 from display panels 31R, 31G, 31B in the optical systems of any of R, G, B are also equal. There is no need to construct a relay optical system. As a result, the number of components can be reduced and an image having superior uniformity can be obtained in the display quality of a low-cost projection screen.

In addition, the present exemplary embodiment uses LCOS that is a reflective display element. Further, in addition to LCOS, a device such as a DMD can also be used as a reflective display element.

Third Exemplary Embodiment

Figure 4:
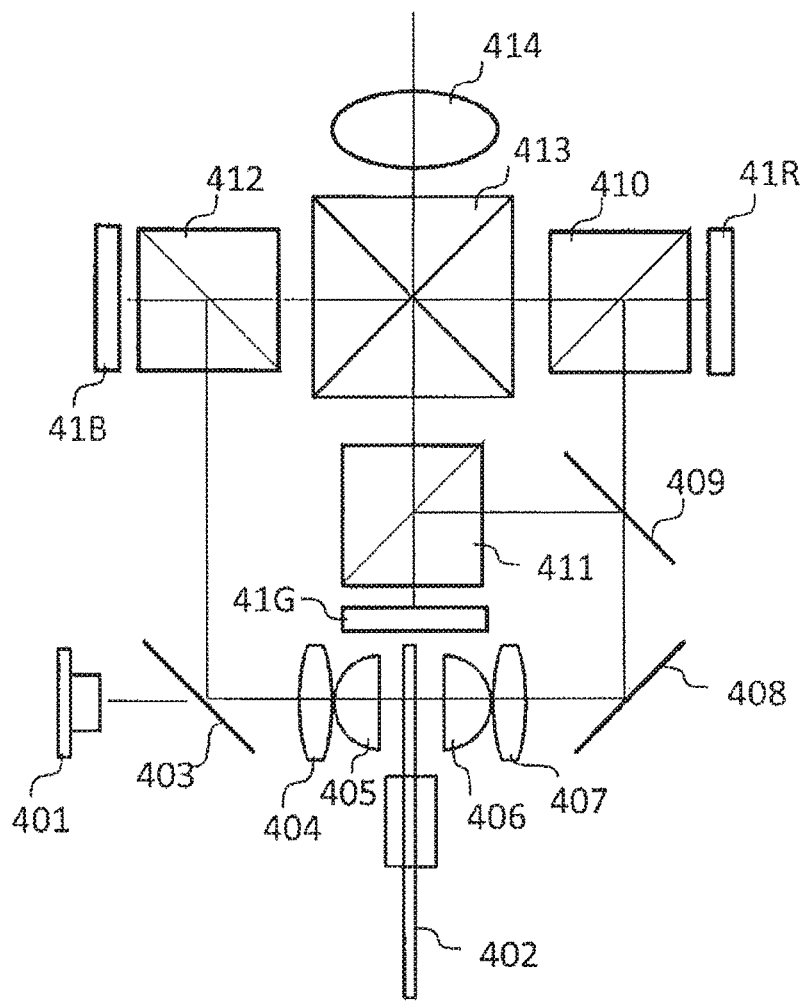
FIG. 4 is a block diagram showing the configuration of the optical system of the third exemplary embodiment of the projector according to the present invention.

The third exemplary embodiment of the present invention is next described. FIG. 4 is a block diagram showing the configuration of the optical system of the third exemplary embodiment of the projector according to the present invention.

The optical system shown in FIG. 4 is provided with: B laser light source 401; dichroic mirrors 403 and 309; lens series 404 and 405; phosphor wheel 402; lens series 406 and 407; reflecting mirror 408; polarization beam splitters 410, 411, and 412; reflective liquid crystal panels 41R, 41G, and 41B; cross-dichroic prism 413; and projection lens 414.

The difference between the present exemplary embodiment and the second exemplary embodiment is the direction of extraction of light from the phosphor wheel. This was also true of the first exemplary embodiment, but in the second exemplary embodiment, the Y fluorescence is reflected on the laser light source 401-side. In contrast, in the present exemplary embodiment, phosphor wheel 402 is configured such that the direction of advance of Y fluorescence is directed along the extension of the direction of advance of excitation light, and B light of excitation light that does not undergo wavelength conversion is reflected and travels on the side of laser light source 401.

Figure 7:
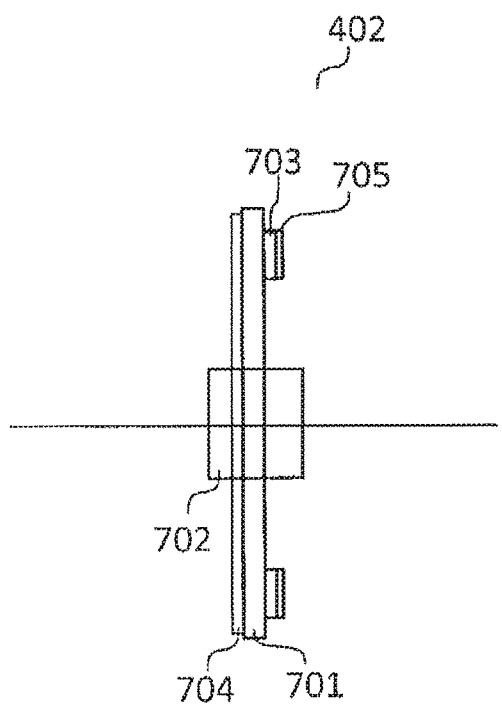
FIG. 7 is a side surface view showing the configuration of phosphor wheel 402 that is used in the third exemplary embodiment.

FIG. 7 is a side surface view showing the configuration of phosphor wheel 402 that is used in the present exemplary embodiment. Phosphor wheel 402 is provided with: transparent substrate 701; motor 702; phosphor 703 that is formed in a ring shape; reflecting surface 704 that is formed on the side of the substrate surface on which phosphor is not formed and that has the characteristic of transmitting B light and reflecting Y light; and reflecting surface 705 that is formed on the opposite side (air side) of the substrate of the phosphor and that reflects B light and transmits Y light. This reflecting surface 705 can also be arranged independent of phosphor wheel 402 at a position in the vicinity of phosphor 703.

By means of the above-described configuration, G light and R light that are generated from Y light illuminate display panels 41G and 41R, and B light illuminates display panel 41B. In the configuration shown in FIG. 4, if the light from laser light source 401 is P-polarized light, polarization beam splitter 403 should have the characteristic of transmitting P-polarized light and reflecting S-polarized light. A phase difference plate such as a quarter-wave plate is preferably provided in the vicinity of the lens series or phosphor wheel 402 to convert the polarization direction of B light that is directed from phosphor wheel 402 and toward polarization beam splitter 403 to S-polarized light. The operation and effect are similar to those of the first exemplary embodiment and the second exemplary embodiment.

Fourth Exemplary Embodiment

Figure 5:
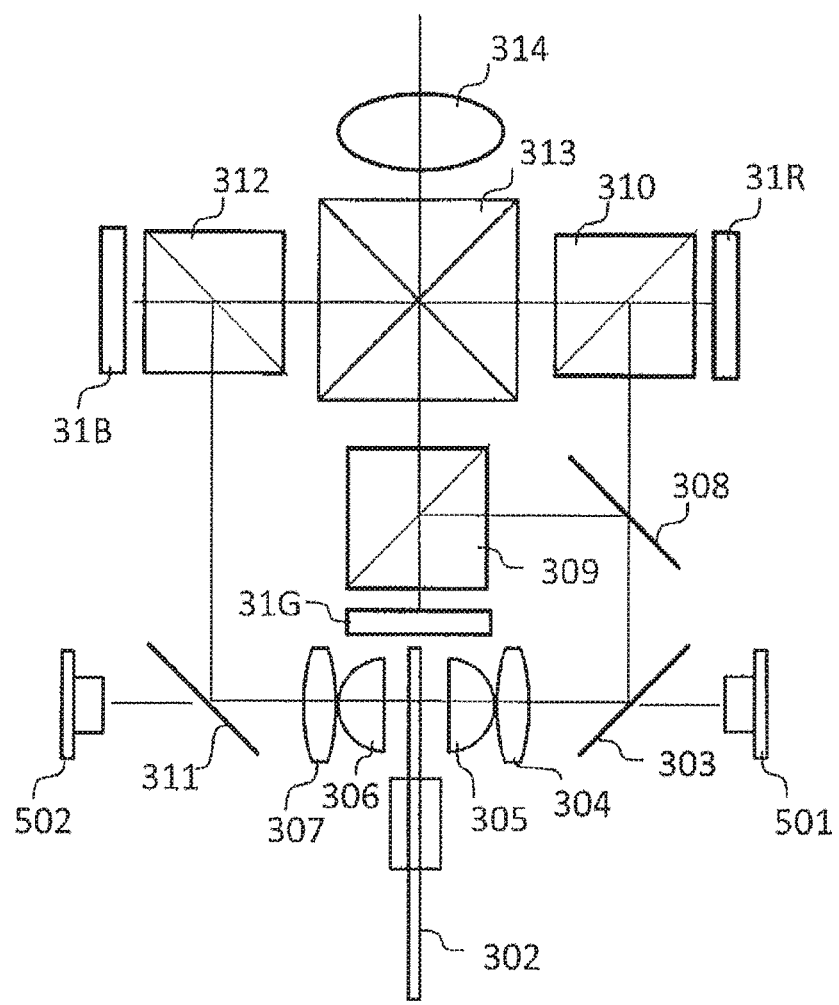
FIG. 5 is a block diagram showing the configuration of the optical system of the fourth exemplary embodiment of the projector according to the present invention.

The fourth exemplary embodiment of the present invention is next described. FIG. 5 is a block diagram showing the configuration of the optical system of the fourth exemplary embodiment of the projector according to the present invention.

The higher luminance of this type of projector depends on the intensity of fluorescence. Accordingly, the fluorescence emitted by the phosphor wheel is preferably increased.

The present exemplary embodiment is a device that takes as a basis the configuration of the second exemplary embodiment shown in FIG. 3, and further, that adds a laser light source as the excitation light. In the present exemplary embodiment, laser light sources 501 and 502 are deployed on both sides of the substrate surface of phosphor wheel 302. By adopting this configuration, excitation is added not only by the fluorescence from laser light source 502 but also by the excitation from laser light source 501, whereby stronger Y fluorescence can be obtained. In addition, the R optical system and B optical system are present symmetrically with respect to phosphor wheel 302, whereby the effects of the simpler optical system configuration and higher image quality are similar to those of the previously described exemplary embodiments.

The present invention described in each of the above-described exemplary embodiments is characterized by the configuration of a phosphor wheel that emits fluorescence in an optical system of a three-panel-type projector that forms fluorescence with lasers as the excitation light, uses this fluorescence in the illumination of the green (G light) and red (R light) display panels, and uses excitation light as the illumination of the blue (B light) display panel.

The phosphor wheel that is used in the present invention combines a transmissive phosphor wheel and a reflective phosphor wheel. In other words, although the phosphor wheel takes the transmissive type as a basis, it also extracts fluorescence in the direction opposite that of the direction of advance of the excitation light (a method of light extraction that is the same as a reflective phosphor wheel) and extracts a portion of the excitation light (B light) in the same direction as the direction of advance as excitation light.

Focusing on the phosphor wheel, Y light that contains G light and R light is formed simultaneously with B light in opposite directions. The key point is that the Y light and B light are constantly being generated. The three colors of R, G, and B are constantly required in the three panels. As a result, this light formation differs from formation in which white light of mixed excitation light and fluorescence is formed in the same direction, as in a conventional transmissive phosphor wheel. Accordingly, parts for splitting light in the subsequent optical system become unnecessary. This configuration therefore has the effect of decreasing the number of parts, facilitating miniaturization, and reducing costs. In particular, two colors (for example, Y and B) can be generated in opposite directions from this phosphor wheel, whereby the need for a relay optical system that was often required in a conventional optical system is also eliminated. This is because the distances from the light-emitting portion (the light-emitting unit on the phosphor wheel) to the display panels can be made the same for all of the colors R, G, and B. This configuration therefore has the effect of higher performance due to the improvement of uniformity of the projected image luminance, a decrease of the number of parts and a reduction of cost due to the lack of a relay optical system, and the simplification of the optical system configuration.

EXPLANATION OF THE REFERENCE NUMBERS 101, 301, 401, 501, 502, 601 laser light source
102, 302, 402, phosphor wheel
103, 108, 303, 308, 409 dichroic mirror
104, 105, 106, 107, 304, 305, 306, 307, 404, 405, 406, 407, 602, 603, 604 lens
109, 110, 111, 112, 311, 408 mirror
113, 313, 413 cross dichroic prism
114, 314, 414 projection lens
11R, 11G, 11B, 31R, 31G; 31B, 41R, 41G; 41B display panel
201, 701 substrate
202, 702 motor
203, 703 phosphor
204 reflecting film
704, 705 reflecting surface
309, 310, 312, 403, 410, 411, 412 polarization beam splitter

The invention claimed is:

1. A projector comprising:
a phosphor wheel that, in response to the irradiation of excitation light that is used as first illumination light, emits fluorescence that contains second illumination light and third illumination light and that emits said excitation light and said fluorescence in mutually opposite directions;
first to third image display elements that are provided corresponding to said first to third illumination light;
a first illumination optical system that guides excitation light that is emitted from said phosphor wheel to said first image display element; and
a second illumination optical system and third illumination optical system that guide said second illumination light and third illumination light that are contained in said fluorescence emitted from said phosphor wheel to said second image display element and said third image display element;
wherein:
the lengths of the optical paths of said first to third illumination optical systems are equal.

2. The projector according to claim 1, wherein said phosphor wheel has: a substrate that transmits said excitation light, and a phosphor that is fixed to the substrate and that emits said fluorescence in response to the irradiation of said excitation light.

3. The projector according to claim 1, further comprising a reflecting film that is formed on the side of said phosphor wheel on which said phosphor is not formed and that reflects said fluorescence and transmits said excitation light.

4. The projector according to claim 1, wherein said excitation light is blue light, said fluorescence is yellow light, said second illumination light is green light, and said third illumination light is red light.

5. The projector according to claim 1, wherein said first to third image display elements comprise transmissive liquid crystal panels.

6. The projector according to claim 1, wherein said first to third image display elements comprise reflective liquid crystal panels.

7. The projector according to claim 1, wherein said first to third image display elements comprise Digit Micromirror Devices (DMDs).

\* \* \* \* \*